US012659486B2

(12) United States Patent
Kim et al.

(10) Patent No.: US 12,659,486 B2
(45) Date of Patent: Jun. 16, 2026

(54) FEATURE ENCODING/DECODING METHOD, DEVICE, RECORDING MEDIUM STORING BITSTREAM, AND METHOD FOR TRANSMITTING BITSTREAM

(71) Applicant: LG Electronics Inc., Seoul (KR)

(72) Inventors: Chulkeun Kim, Seoul (KR); Jaehyun Lim, Seoul (KR); Donggyu Gwak, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/844,628

(22) PCT Filed: Mar. 7, 2023

(86) PCT No.: PCT/KR2023/003073
§ 371 (c)(1),
(2) Date: Sep. 6, 2024

(87) PCT Pub. No.: WO2023/172017
PCT Pub. Date: Sep. 14, 2023

(65) Prior Publication Data
US 2025/0234005 A1 Jul. 17, 2025

(30) Foreign Application Priority Data

Mar. 7, 2022 (KR) ........................ 10-2022-0028829

(51) Int. Cl.
*H01L 29/94* (2006.01)
*G06V 10/77* (2022.01)
(Continued)

(52) U.S. Cl.
CPC ....... *H04N 19/136* (2014.11); *G06V 10/7715* (2022.01); *H04N 19/169* (2014.11); *H04N 19/70* (2014.11)

(58) Field of Classification Search
CPC .... H04N 19/136; H04N 19/169; H04N 19/70; H04N 19/20; H04N 19/119;
(Continued)

(56) References Cited

U.S. PATENT DOCUMENTS 11,838,551 B2 * 12/2023 Goswami ............. H04N 19/147
2003/0108099 A1 * 6/2003 Nagumo ................... G06T 9/20
375/E7.199
(Continued)

FOREIGN PATENT DOCUMENTS

AU 2021202140 A1 * 10/2022 ............. G06N 3/063
CN 113223101 A 8/2021
(Continued)

OTHER PUBLICATIONS

International Search Report and Written Opinion in International Appln. No. PCT/KR2023/003073, mailed on May 31, 2023, 8 pages (with partial English translation).
(Continued)

*Primary Examiner* — Joseph Suh
(74) *Attorney, Agent, or Firm* — Fish & Richardson P.C.

(57) ABSTRACT

Provided are a feature encoding/decoding method and device, a recording medium on which a bitstream generated by the feature encoding method is stored, and a method for transmitting the bitstream. The feature decoding method according to the present disclosure comprises the steps of: determining whether or not an input source is feature data; determining a feature map type of the feature data based on the input source being the feature data; obtaining encoding information of the feature data from a bitstream; and decoding the feature data based on the feature map type and the encoding information, and whether or not the input source is
(Continued)

the feature data may be determined based on input format identification information that is obtained from a sequence parameter set.

7 Claims, 16 Drawing Sheets

(51) Int. Cl.

| | | |
|---|---|---|
| *H04N 19/136* | (2014.01) | |
| *H04N 19/169* | (2014.01) | |
| *H04N 19/70* | (2014.01) | |

(58) Field of Classification Search

CPC .... H04N 19/124; H04N 19/13; H04N 19/184; H04N 19/463; H04N 19/82; G06V 10/7715

See application file for complete search history.

(56) References Cited

U.S. PATENT DOCUMENTS

| | | | | |
|---|---|---|---|---|
| 2021/0182111 A1 * | 6/2021 | Jakobsson | ............. | G06F 9/5055 |
| 2021/0203997 A1 | 7/2021 | Veselov et al. | | |
| 2021/0297685 A1 * | 9/2021 | Karczewicz | ......... | H04N 19/157 |
| 2022/0286459 A1 * | 9/2022 | Dohare | ................. | H04L 63/107 |
| 2022/0292730 A1 * | 9/2022 | Gao | ........................ | G06T 9/005 |
| 2023/0085554 A1 | 3/2023 | Kim et al. | | |
| 2023/0370087 A1 * | 11/2023 | Henry | ................... | H04N 19/13 |

FOREIGN PATENT DOCUMENTS

| | | | | |
|---|---|---|---|---|
| KR | 10-2021-0147830 A | 12/2021 | | |
| WO | WO-2012124461 A1 * | 9/2012 | ............. | H04N 19/61 |
| WO | 2021/050007 A1 | 3/2021 | | |
| WO | 2021/172956 A1 | 9/2021 | | |
| WO | WO 2021/177652 A1 | 9/2021 | | |
| WO | WO 2021/205065 A1 | 10/2021 | | |
| WO | 2022/226087 A1 | 10/2022 | | |

OTHER PUBLICATIONS

Choi et al., "Deep Feature Compression for Collaborative Object Detection," Paper, Presented at the Proceedings of the 25th IEEE International Conference on Image Processing (ICIP), Athens, Greece, Oct. 7-10, 2018, pp. 3743-3747.

Extended European Search Report in European Appln. No. 23767118. 5, mailed on Dec. 8, 2025, 17 pages.

Han et al., "[VCM] Investigation on feature map channel reordering and compression for object detection," ISO/IEC JTC 1/SC 29/WG 2, MPEG Technical Requirements, Online, m56653, Apr. 2021, 5 pages.

Zhang et al., "IN/CM] Updates to use cases and requirements for video coding for machines," ISO/IEC JTC 1/SC 29/WG 2, MPEG Technical Requirements, Online, m57648, Jul. 2021, 18 pages.

* cited by examiner

Image/Video → 710 FEATURE EXTRACTOR NETWORK → 720 ENCODING APPARATUS → 730 DECODING APPARATUS → 740 TASK NETWORK FIG. 8
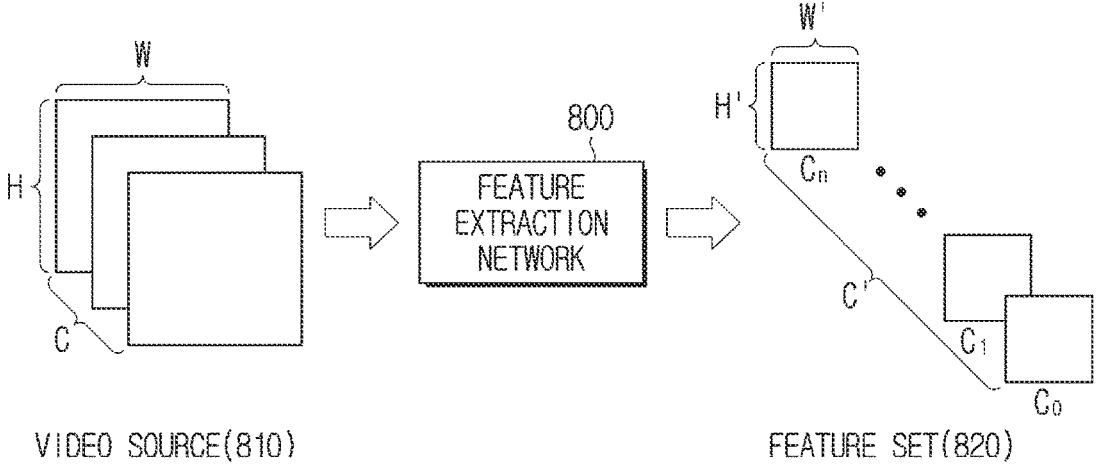
VIDEO SOURCE(810)                    FEATURE SET(820)
FIG. 9
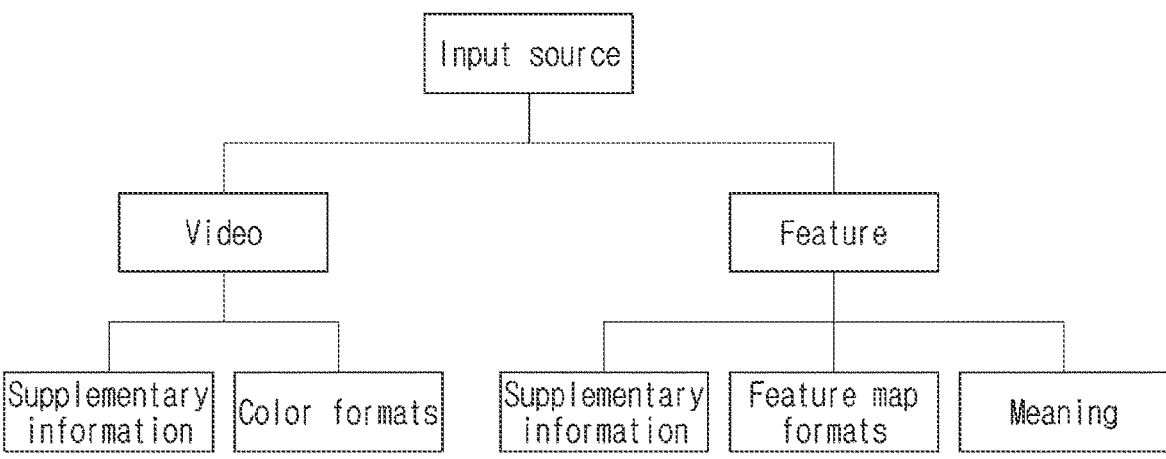
FIG. 10
| seq_parameter_set_rbsp( ) { | Descriptor |
|---|---|
| sps_input_format_id | u(1) |
| if(!sps_input_format_id){ | |
| sps_chroma_format_id | u(2) |
| }else | |
| sps_feature_format_id | u(1) |
| } | |

FIG. 12

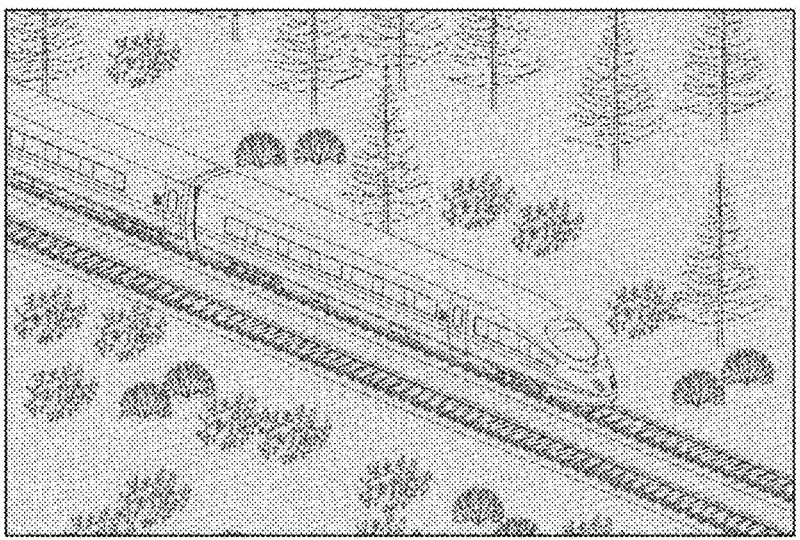

FIG. 13

| seq_parameter_set_rbsp( ) { | Descriptor |
|---|---|
| sps_input_format_id | u(3) |

FIG. 14

| seq_parameter_set_rbsp( ) { | Descriptor |
|---|---|
| sps_input_format_id | u(1) |
| if(!sps_input_format_id){ | |
| sps_chroma_format_id | u(2) |
| }else{ | |
| sps_feature_format_id | u(1) |
| } | |
| supplementary_info_flag | u(1) |
| if(supplementary_info_flag){ | |
| if(!sps_input_format_id){ | |
| video_supplementarty_info | |
| }else | |
| feature_supplementary_info | |
| if(sps_input_format_id){ | |
| feature_meaning_flag | u(1) |
| if(feature_meaning_flag) | |
| feature_info | |
| } | |
| } | |

FIG. 15

| seq_parameter_set_rbsp( ) { | Descriptor |
|---|---|
| sps_input_format_id | u(3) |
| supplementary_info_flag | u(1) |
| if(supplementary_info_flag){ | |
| if(sps_input_format_id <4){ | |
| video_supplementarty_info | |
| }else{ | |
| feature_supplementary_info | |
| } | |
| } | |
| if(sps_input_format_id >3){ | |
| feature_meaning_flag | u(1) |
| if(feature_meaning_flag) | |
| feature_info | |
| } | |
| } | |

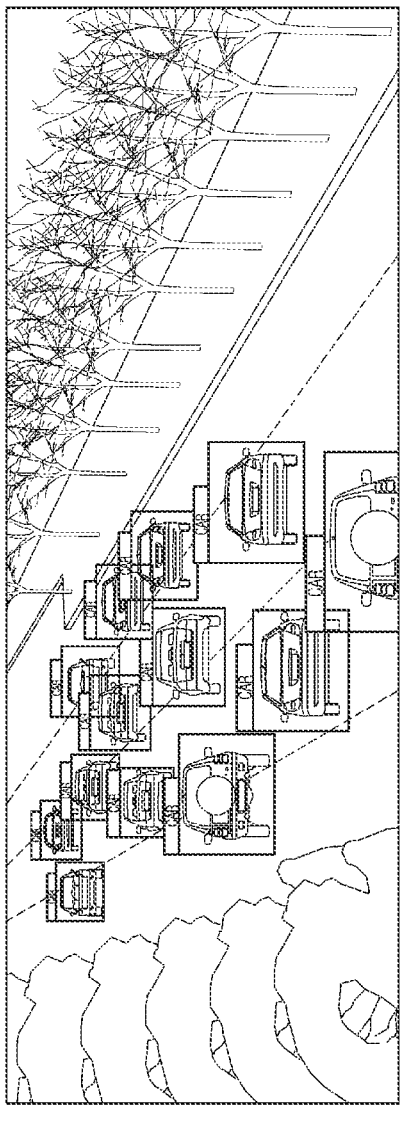
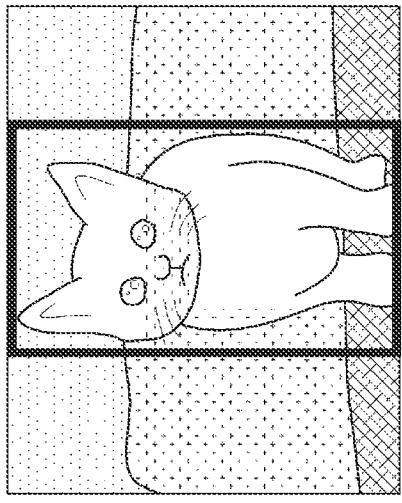
FIG. 16

FIG. 17

| supplementarty_info ( ) { | Descriptor |
|---|---|
| ... | |
| structured_coding_flag | u(1) |
| if( structured_coding_flag ) { | |
| background_coding_flag | u(1) |
| number_of_foreground_regions | |
| for( i = 0; i <= number_of_foreground_regions; i++ ) { | |
| foreground_x_pos | |
| foreground_y_pos | |
| foreground_width | |
| foreground_height | |
| | |
| } | |
| ... | |
| } | |

FIG. 18A

| picture_parameter_set_rbsp( ) { | Descriptor |
|---|---|
| data_property_id | u(3) |
| } | |

FIG. 18B

| seq_parameter_set_rbsp( ) { | Descriptor |
|---|---|
| data_property_id | u(3) |
| } | |

FEATURE ENCODING/DECODING METHOD, DEVICE, RECORDING MEDIUM STORING BITSTREAM, AND METHOD FOR TRANSMITTING BITSTREAM

CROSS-REFERENCE TO RELATED APPLICATIONS

This application is a National Stage application under 35 U.S.C. § 371 of International Application No. PCT/KR2023/003073, filed on Mar. 7, 2023, which claims the benefit of Korean Patent Application No. 10-2022-0028829, filed on Mar. 7, 2022. The disclosures of the prior applications are incorporated by reference in their entirety.

TECHNICAL FIELD

The present disclosure relates to a feature encoding/decoding method and apparatus, and more specifically, to a feature encoding/decoding method and apparatus based on information on the type and property of an input source, a recording medium storing a bitstream generated by the feature encoding method/apparatus of the present disclosure, and a method of transmitting a bitstream.

BACKGROUND ART

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

DISCLOSURE

Technical Problem

An object of the present disclosure is to provide a feature encoding/decoding method and apparatus with improved encoding/decoding efficiency.

Another object of the present disclosure is to provide a feature encoding/decoding method and apparatus based on information on the type and property of an input source.

Another object of the present disclosure is to provide a feature encoding/decoding method and apparatus based on supplementary information and meaning information of an input source.

Another object of the present disclosure is to provide a feature encoding/decoding method and apparatus based on data property information related to a privacy protection level.

Another object of the present disclosure is to provide a method of transmitting a bitstream generated by a feature encoding method or apparatus according to the present disclosure.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

Technical Solution

A feature decoding method according to an aspect of the present disclosure may comprise determining whether or not an input source is feature data, determining a feature map type of the feature data based on the input source being the feature data, obtaining encoding information of the feature data from a bitstream, and decoding the feature data based on the feature map type and the encoding information, and whether or not the input source is the feature data may be determined based on input format identification information that is obtained from a sequence parameter set.

A feature decoding apparatus according to another aspect of the present disclosure may comprise a memory and at least one processor. The at least one processor may determine whether or not an input source is feature data, determine a feature map type of the feature data based on the input source being the feature data, obtain encoding information of the feature data from a bitstream, and decode the feature data based on the feature map type and the encoding information, and whether or not the input source is the feature data may be determined based on input format identification information that is obtained from a sequence parameter set.

A feature encoding method according to an aspect of the present disclosure may comprise generating first information indicating whether or not an input source is feature data, generating second information indicating a feature map type of the feature data based on the input source being the feature data, generating encoding information of the feature data, and encoding the first information, the second information and the encoding information in a bitstream, and the first information may be included in a sequence parameter as input format identification information.

A feature encoding apparatus according to another aspect of the present disclosure may comprise a memory and at least one processor. The at least one processor may generate first information indicating whether or not an input source is feature data, generate second information indicating a feature map type of the feature data based on the input source being the feature data, generate encoding information of the feature data and encode the first information, the second information and the encoding information in a bitstream, and the first information may be included in a sequence parameter as input format identification information.

A recording medium according to another aspect of the present disclosure may store a bitstream generated by the feature encoding method or the feature encoding apparatus of the present disclosure.

A bitstream transmission method according to another aspect of the present disclosure may transmit a bitstream generated by the feature encoding method or the feature encoding apparatus of the present disclosure to a feature decoding apparatus.

The features briefly summarized above with respect to the present disclosure are merely exemplary aspects of the detailed description below of the present disclosure, and do not limit the scope of the present disclosure.

Advantageous Effects

According to the present disclosure, it is possible to provide a feature information encoding/decoding method and apparatus with improved encoding/decoding efficiency.

Also, according to the present disclosure, it is possible to provide an image encoding/decoding method and apparatus based on information on the type and property of an input source.

Also, according to the present disclosure, it is possible to provide an image encoding/decoding method and apparatus based on supplementary information and meaning information of an input source.

Also, according to the present disclosure, it is possible to provide an image encoding/decoding method and apparatus based on data property information related to a privacy protection level.

Also, according to the present disclosure, it is possible to provide a method of transmitting a bitstream generated by a feature encoding method or apparatus according to the present disclosure.

Also, according to the present disclosure, it is possible to provide a recording medium storing a bitstream generated by a feature encoding method or apparatus according to the present disclosure.

Also, according to the present disclosure, it is possible to provide a recording medium storing a bitstream received, decoded and used to reconstruct a feature by a feature decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 1 is a view schematically showing a VCM system to which embodiments of the present disclosure are applicable.

FIG. 7 is a view showing a feature extraction/processing procedure.

FIG. 8 is a view showing an example of a feature extraction method using a feature extraction network.

FIG. 9 is a view showing an example of a hierarchical information structure of VCM.

FIG. 10 is a view showing a syntax structure including input source information according to an embodiment of the present disclosure.

4

Figure 11:
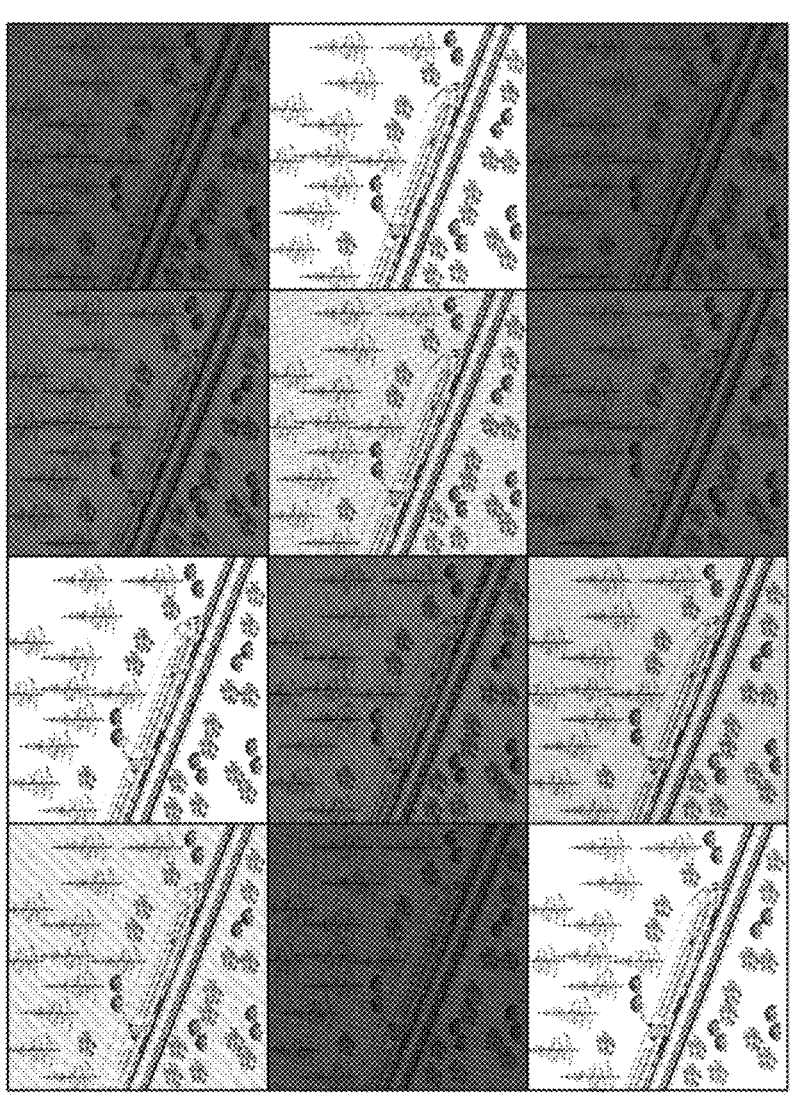

FIG. 11 is a view showing an example of a feature map with a tile/frame property.

FIG. 12 is a view showing an example of a feature map with a quilting property.

FIG. 13 is a view showing a syntax structure including input source information according to an embodiment of the present disclosure.

FIG. 14 and FIG. 15 are views showing syntax structures including supplementary information and meaning information according to an embodiment of the present disclosure.

FIG. 16 is a view showing examples of input images distinguished with foreground and background.

FIG. 17 is a view showing a syntax structure including supplementary information of an image/video input according to an embodiment of the present disclosure.

FIG. 18A is a view showing an example of information on a personal information property encoded in a picture unit.

FIG. 18B is a view showing an example of information on a personal information property encoded in a sequence unit.

Figure 19:
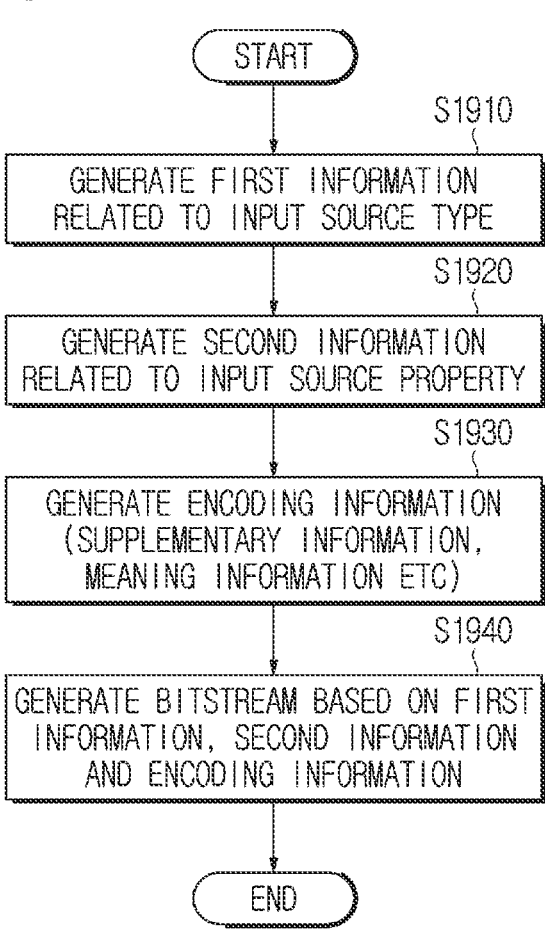

FIG. 19 is a flowchart showing a feature encoding method according to an embodiment of the present disclosure.

Figure 20:
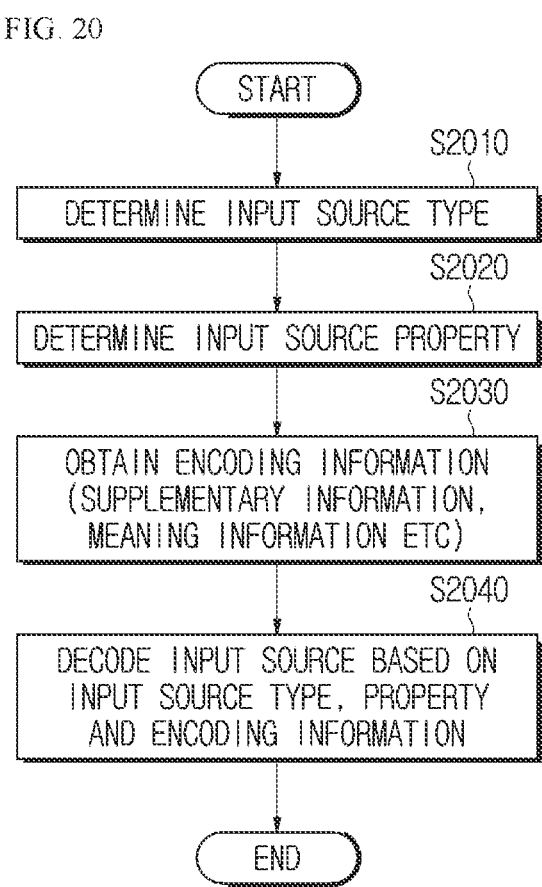

FIG. 20 is a flowchart showing a feature decoding method according to an embodiment of the present disclosure.

Figure 21:
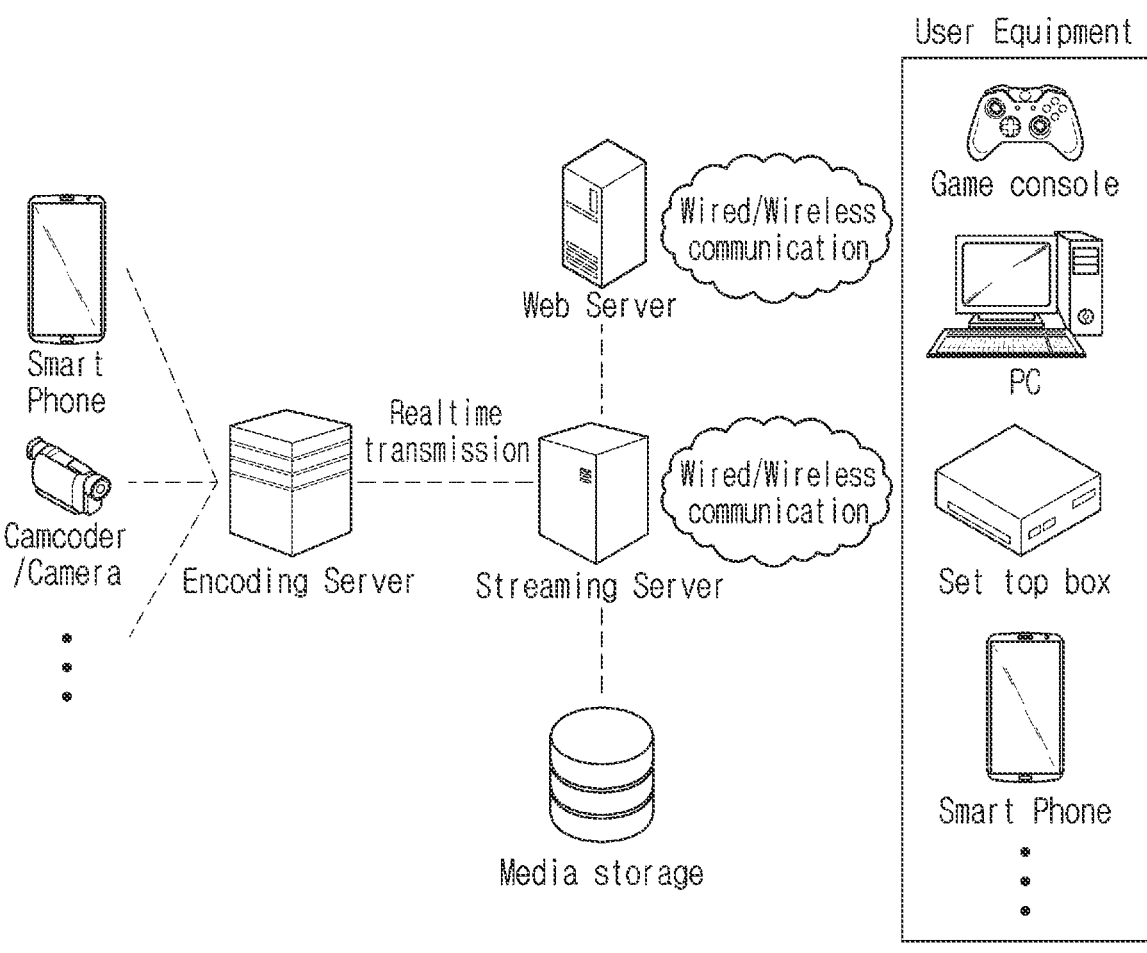

FIG. 21 is a view illustrating an example of a content streaming system to which embodiments of the present disclosure are applicable.

Figure 22:
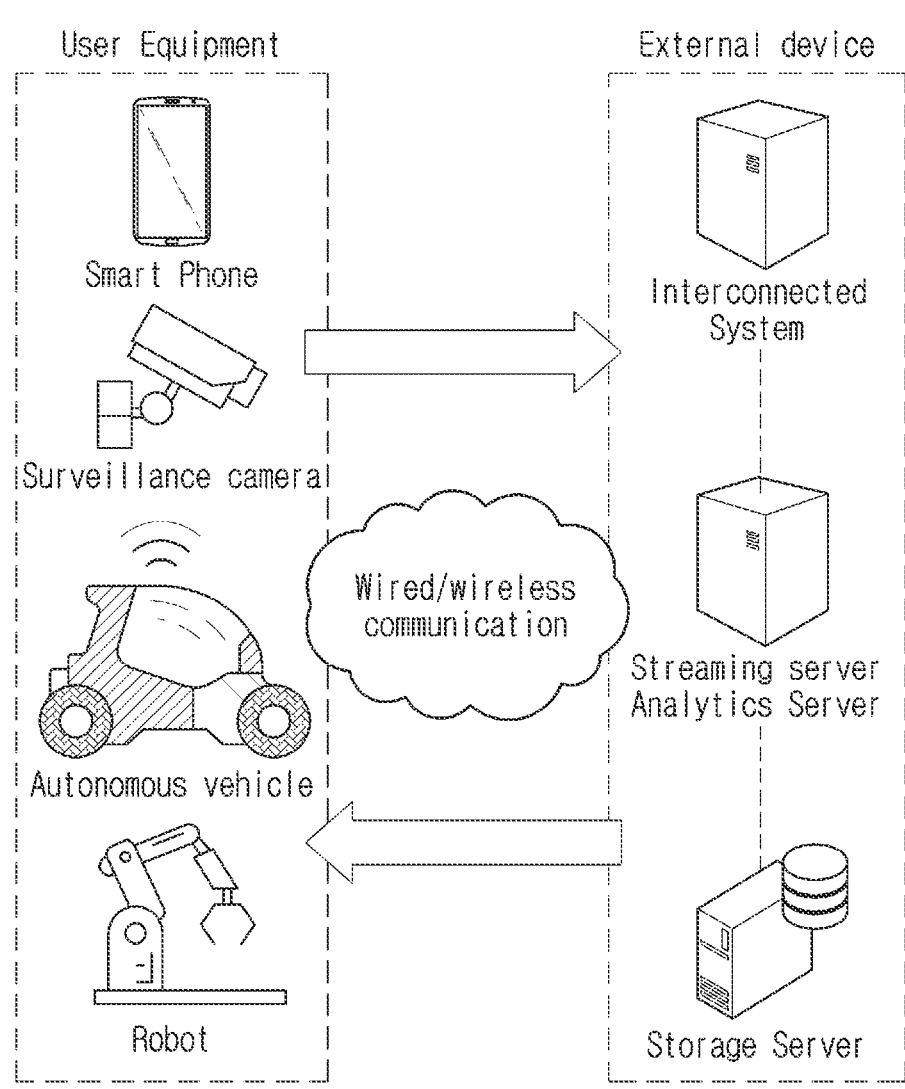

FIG. 22 is a view showing another example of a content streaming system to which embodiments of the present disclosure are applicable.

MODE FOR INVENTION

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

| This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure. "current block" may mean one of "current coding block", "current coding unit", "coding target block", "decoding target block" or "processing target block". When prediction is performed. "current block" may mean "current prediction block" or "prediction target block". When transform (inverse transform)/quantization (dequantization) is performed. "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems, VCM may be used to transmit vehicle location information collected from GPS, sensing information collected from LIDAR, radar, etc., and various vehicle control information to other vehicles or infrastructure. Additionally, in the smart city field. VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

Figure 1:
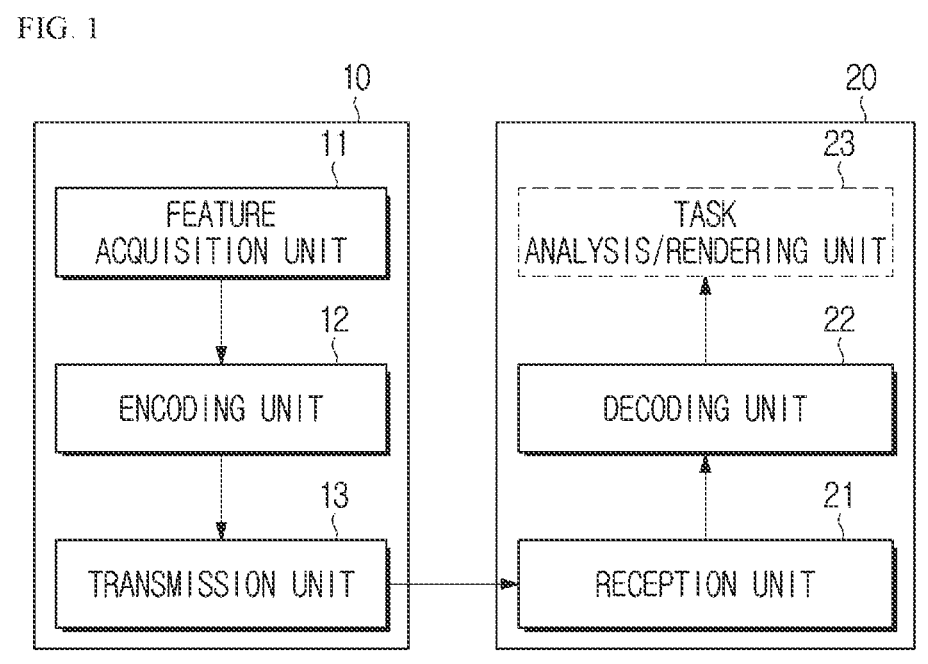

FIG. 1 is a diagram schematically showing a VCM system to which embodiments of the present disclosure are applicable.

Referring to FIG. 1, the VCM system may include an encoding apparatus 10 and a decoding apparatus 20.

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden layer. In the present disclosure, a feature map may be referred to as a feature set.

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction, transform, and quantization to increase encoding efficiency. The encoded data (encoded feature/feature map information) may be output in the form of a bitstream. The bitstream containing the encoded feature/feature map information may be referred to as a VCM bitstream.

| The transmission unit 13 may forward feature/feature map information or data output in the form of a bitstream to the decoding apparatus 20 through a digital storage medium or network in the form of a file or streaming. Here, digital storage media may include various storage media such as USB. SD. CD, DVD, Blu-ray. HDD, and SSD. The transmission unit 13 may include elements for generating a media file with a predetermined file format or elements for transmitting data through a broadcasting/communication network.

The decoding apparatus 20 may acquire feature/feature map information from the encoding apparatus 10 and reconstruct the feature/feature map based on the acquired information.

The decoding apparatus 20 may include a reception unit 21 and a decoding unit 22.

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 12 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance. Various machine (oriented) tasks may be performed based on task analysis results and the rendered features/feature map. As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard.

VCM Pipeline

Figure 2:
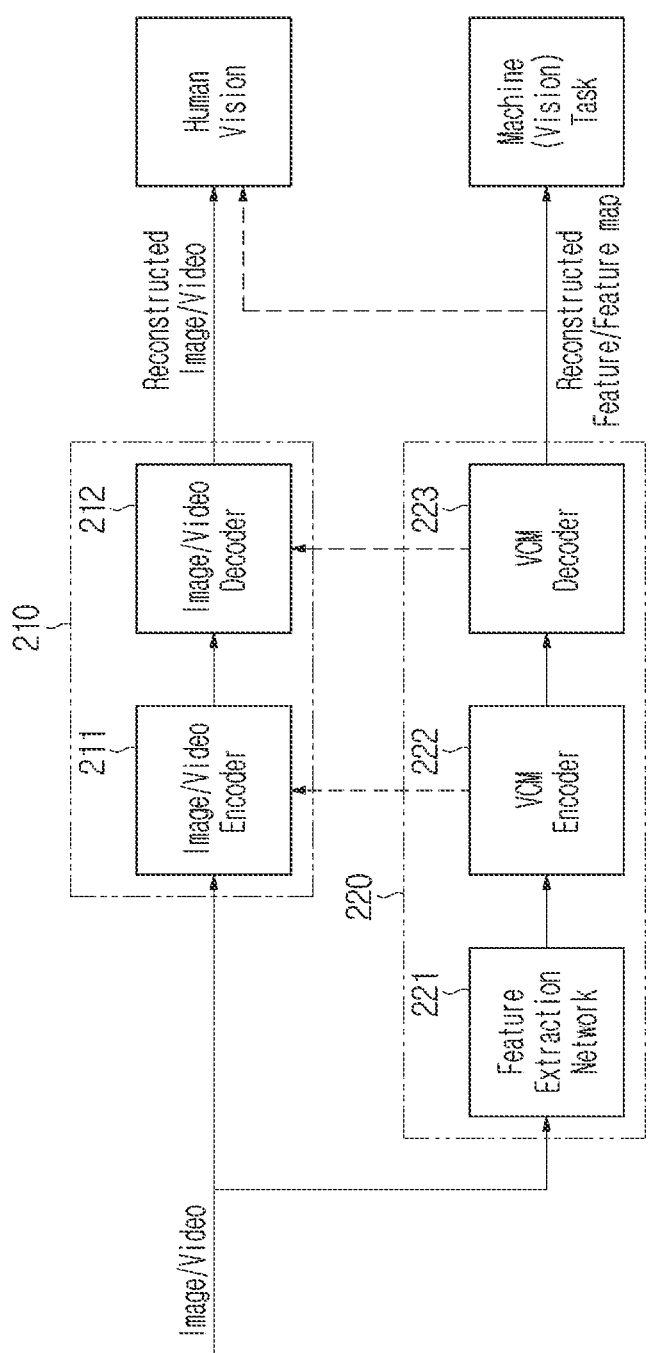
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map. In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example, Surveillance, Intelligent Transportation, Smart City, Intelligent Industry. Intelligent Content, etc. Depending on the embodiment, the reconstructed feature/feature map may be used for human vision.

Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/feature map encoder), and the fourth stage 222 may be performed by a VCM decoder (or feature/feature map encoder). Hereinafter, the encoder/decoder structure will be described in detail.

Encoder

Figure 3:
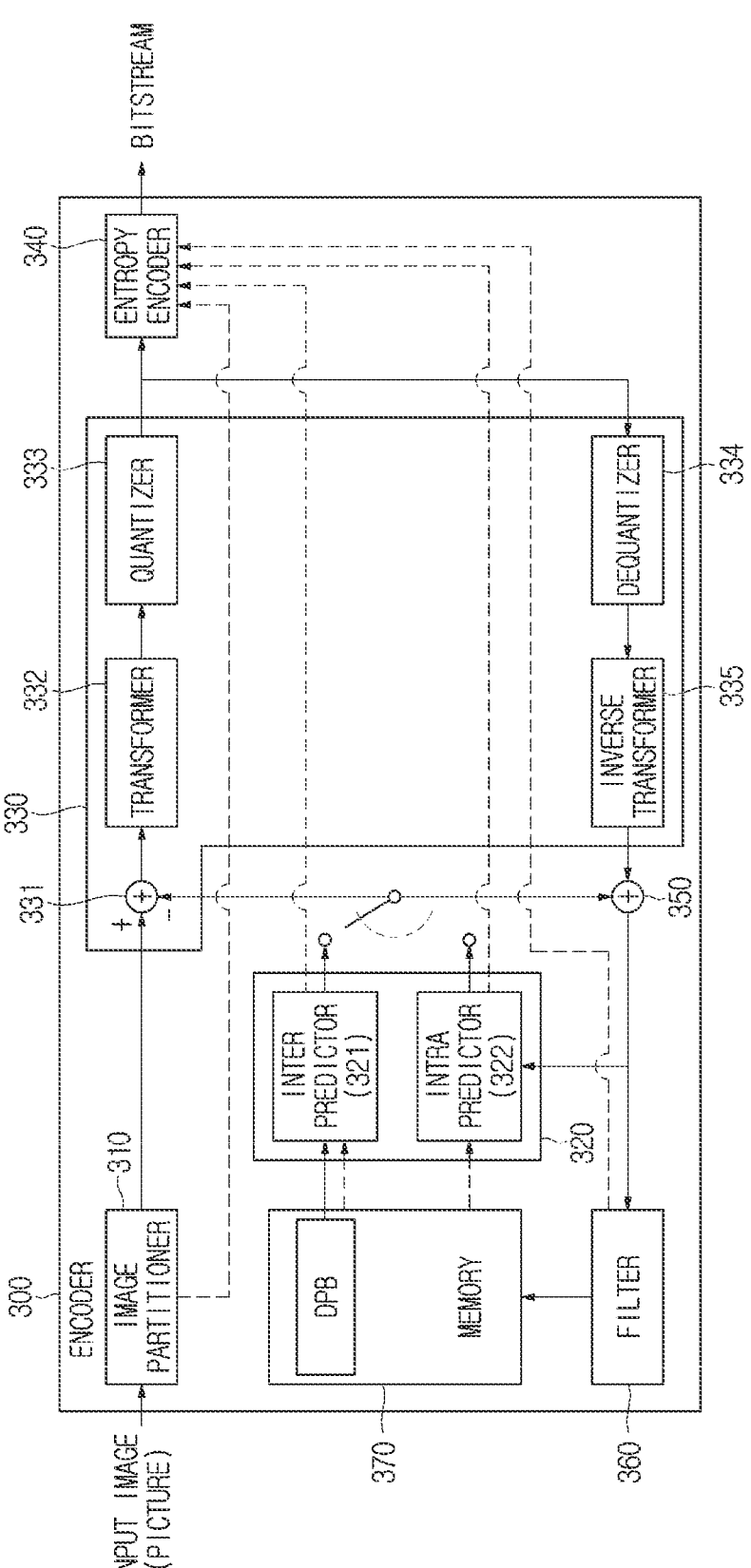
FIG. 3 is a diagram schematically showing an image/video encoder to which embodiments of the present disclosure are applicable.

FIG. 3 is a diagram schematically showing an image/video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322. The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU). For example, one coding unit may be partitioned into a plurality of coding units of deeper depth based on a quad tree structure, binary tree structure, and/or ternary structure. In this case, for example, the quad tree structure may be applied first and the binary tree structure and/or ternary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction. L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is, IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 333 may quantize the transform coefficients and transmit them to the entropy encoder 340. The entropy encoder 340 may encode the quantized signal (information on the quantized transform coefficients) and output a bitstream. The information on the quantized transform coefficients may be referred to as residual information. The quantizer 333 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray. HDD, SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340.

The quantized transform coefficients output from the quantizer 333 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal. For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter 360 may generate various information related to filtering and transmit the generated information to the entropy encoder 190. The information related to filtering may be encoded by the entropy encoder 340 and output in the form of a bitstream.

The modified reconstructed picture transmitted to the memory 370 may be used as the reference picture in the inter predictor 321. Through this, prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.

Decoder

Figure 4:
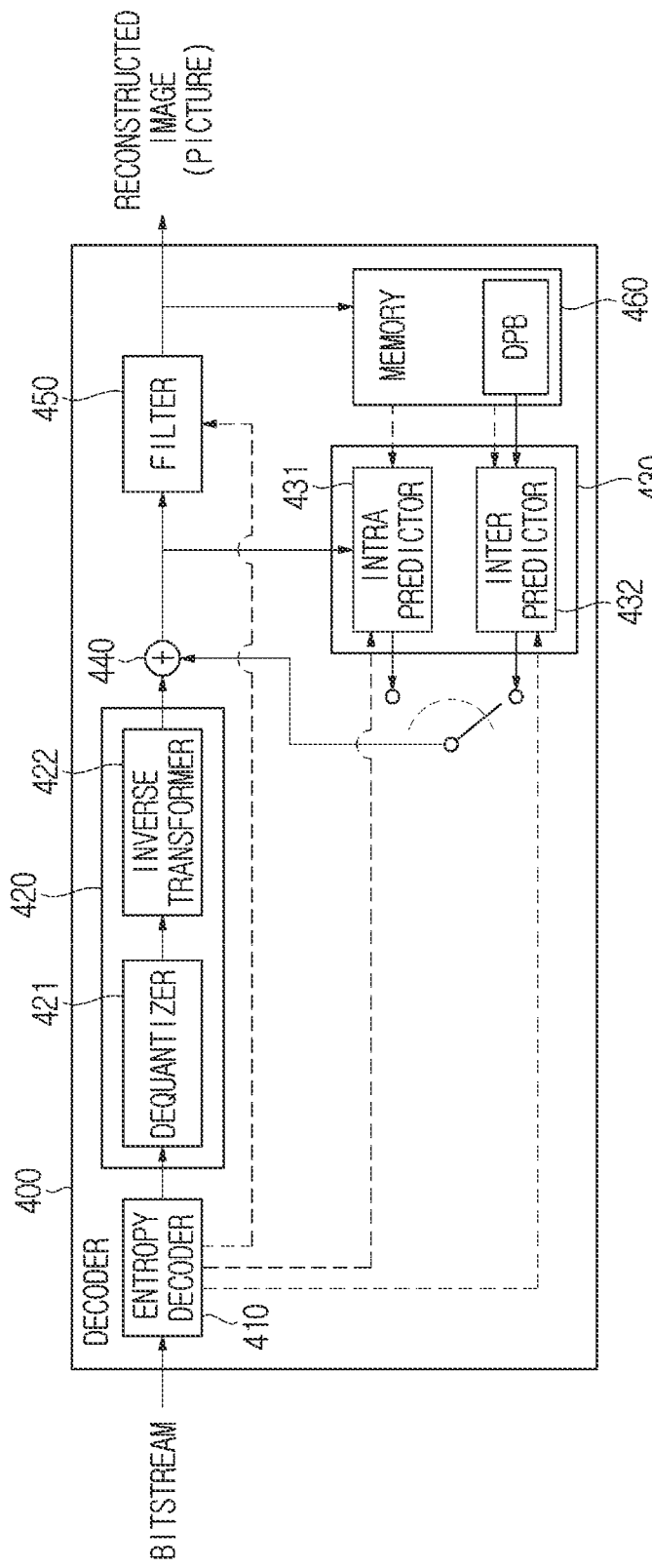
FIG. 4 is a diagram schematically showing an image/video decoder to which embodiments of the present disclosure are applicable.

FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 300 of FIG. 3. For example, the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples, residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode.

The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CHIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is. IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
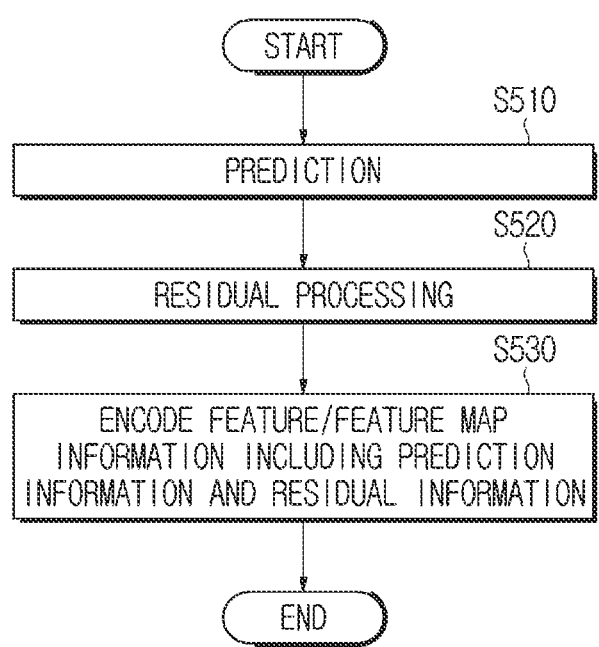
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment.

The inter predictor 321 may predict the current block based on a reference block (i.e., a set of referenced feature elements) specified by motion information on the reference feature/feature map. Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction, L1 prediction, Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/ feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition, (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc.), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally, (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced.

Feature/Feature Map Decoding Procedure

Figure 6:
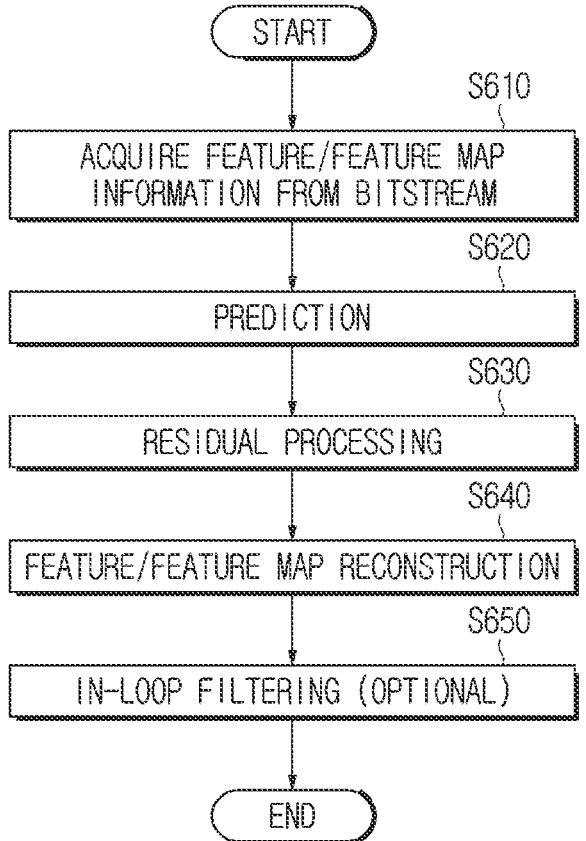
FIG. 6 is a flowchart schematically illustrating a feature/feature map decoding procedure to which embodiments of the present disclosure are applicable.

FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction/Processing Procedure

Figure 7:
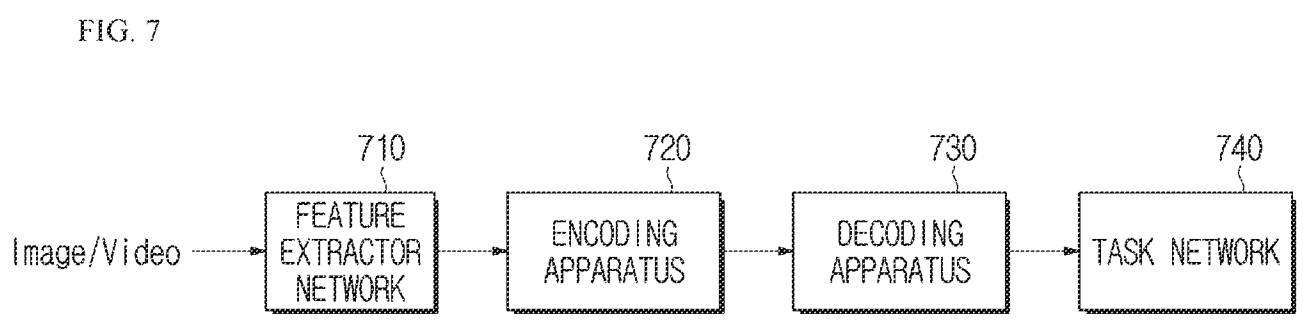

FIG. 7 is a view showing a feature extraction/processing process.

Referring to FIG. 7, feature data obtained from an input image by a feature extraction network 710 may be forwarded to a feature encoding apparatus 720. The feature extraction network may be viewed as a set of continuous hidden layers from the input of a neural network, and may extract floating point type feature data from the input image. The feature encoding apparatus 720 may compress feature data and output it in the form of a bitstream, and a feature decoding apparatus 730 may reconstruct feature data from the bitstream and transmit it to a task network 740.

FIG. 8 is a view an example of a feature extraction method using a feature extraction network.

Referring to FIG. 8, a feature extraction network 800 may receive a video source 810 and perform a feature extraction operation to output a feature set 820. The feature set 820 may consist of a plurality of (feature) channels $C_0, C_1 \ldots C_n$ extracted from the video source 810 and may be expressed as a two-dimensional feature map. Each channel $C_0, C_1 \ldots C_n$ may include a plurality of feature elements (or pixels) and may have different data distribution characteristics.

In FIG. 8. W, H, and C may mean the width, height, and number of channels of the video source 810, respectively. The number C of channels of the video source 810 may be determined based on the image format of the video source 810. For example, when the video source 810 has an RGB image format, the number C of channels of the video source 810 may be 3.

In FIG. 8, W', H', and C' may mean the width, height, and number of channels of the feature set 820 in each channel, respectively. The number C' of channels of the feature set 820 may vary according to a feature extraction method and may be generally larger than the number C of channels of the video source 810. The properties W', H', and C' of the feature set 820 may vary according to the properties W, H and C of the video source 810. For example, as the number C of channels of the video source 810 increases, the number C' of channels of the feature set 820 may also increase. Additionally, the properties W', H', C' of the feature set 820 may vary depending on the type and properties of the feature extraction network 800. For example, if the feature extraction network 800 is implemented as an artificial neural network (e.g., CNN, DNN, etc.), the channel size (that is, W'×H') may vary according to the location of a hidden layer.

Meanwhile, in VCM, requirements are defined regarding a type of encoding information (e.g., image/video, feature), additional information and support for method of use, as shown in the example of Table 1 below.

TABLE 1

1) VCM shall support feature coding. (Feature coding)
Description: VCM shall support the input of feature map.
2) VCM shall provide description of the meaning or the recommended
way of using the decoded data. (Feature coding)
3) VCM should support the use of supplementary information such
as descriptors. (Feature/Video coding)
4) VCM shall support privacy and security (Mandated by ISO)

The requirements as shown in Table 1 are needed because unlike typical video coding, the targets of VCM include not only humans but also machines, and the purposes of VCM include not only humans' view but also a variety of machine tasks. Consequently, input information may vary depending on the purposes of VCM, and relevant supplementary information may also vary as the input information varies. Thus, according to embodiments of the present disclosure, a method for efficiently expressing such variable input information and supplementary information may be provided. Hereinafter, the embodiments of the present disclosure will be described in detail with reference to accompanying drawings.

Embodiment 1

FIG. 9 is a view showing an example of a hierarchical information structure of VCM.

Referring to FIG. 9, the type of an input source may be determined in a highest layer. The types of input sources may be mainly distinguished into an image/video data type and a feature data type. When the type of an input source is determined, property information and supplementary information of each input source may be defined in a lower layer.

Embodiment 1 of the present disclosure relates to a method of defining the type and property of an input source. According to Embodiment 1, a two-stage defining method and a single-stage defining method for the input source information are provided.

FIG. 10 is a view showing a syntax structure including input source information according to an embodiment of the present disclosure. FIG. 10 is an example of defining input source information in two stages.

Referring to FIG. 10, a sequence parameter set seq_parameter_set may include a plurality of syntax elements related to the type and property of an input source.

A syntax element sps_input_format_id may indicate the type of an input source. In an embodiment, sps_input_format_id may have a value of 0 or 1, and the meaning of each value may be defined as in Table 2.

TABLE 2

| sps_input_format_id | Input |
|---|---|
| 0 | Video |
| 1 | Feature |

Referring to Table 2, sps_input_format_id with a value of 0 may indicate that an input source is an image/video. On the other hand, sps_input_format_id with a value of 1 may indicate that an input source is a feature.

A syntax element sps_chroma_format_id may indicate the property of an image/video among input sources. sps_chroma_format_id is encoded/signaled only when sps_input_format_id is 0. In an embodiment, sps_chroma_format_id may have any one value of 0 to 3, and the meaning of each value may be defined as in Table 3.

TABLE 3

| sps_chroma_format_id | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

A syntax element sps_feature_format_id may indicate the property of a feature among input sources, sps_feature_format_id is encoded/signaled only when sps_input_format_id is 1. In an embodiment, sps_feature_format_id may have a value of 0 or 1, and the meaning of each value may be defined as in Table 4.

TABLE 4

| sps_feature_format_id | Feature map type |
|---|---|
| 0 | Tile/Frame |
| 1 | Quilting |

Referring to Table 4, sps_feature_format_id with a value of 0 may indicate that the property of a corresponding feature map is a tile/frame. The tile/frame means that a single feature map is configured by binding feature data in a channel unit. An example of a feature map with the tile/frame property is illustrated in FIG. 11. In a feature map with the tile/frame property, an encoding/decoding unit such as tile may be defined for each channel in order to improve encoding/decoding flexibility of each channel.

On the other hand, sps_feature_format_id with a value of 1 may indicate that the property of a corresponding feature map is quilting. Quilting means that pixel values in a same position are extracted from each channel and are bound in square or rectangular blocks and then a single feature map is configured by disposing the blocks adjacent to each other. An example of a feature map with the quilting property is illustrated in FIG. 12.

Meanwhile, Table 4 is merely illustrative, and the embodiments of the present disclosure are not limited thereto. For example, when the definition of feature is extended, the value of sps_feature_format_id may also be extended.

FIG. 13 is a view showing a syntax structure including input source information according to an embodiment of the present disclosure. FIG. 13 is an example of defining input source information in a single stage.

Referring to FIG. 13, a sequence parameter set seq_parameter_set_rbsp may include one syntax element related to the type and property of an input source.

A syntax element sps_input_format_id may indicate both the type and property of an input source. In an embodiment, sps_input_format_id may have any one value of 0 to 3, and the meaning of each value may be defined as in Table 5.

TABLE 5

| sps_input_format_id | Input format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |
| 4 | Tile | — | — |
| 5 | Quilting | — | — |

Referring to Table 5, sps_input_format_id with values of 0 to 3 may indicate that an input source is an image/video, and sps_input_format_id with a value of 4 or 5 may indicate that an input source is a feature. Thus, the type of an input source may be determined depending on the range of sps_input_format_id value. In addition, sps_input_format_id with a value of 4 may indicate that the property of a corresponding feature map is a tile/frame, and sps_input_format_id with a value of 5 may indicate that the property of a corresponding feature map is quilting. Meanwhile, Table 5 is illustrative, and the embodiments of the present disclosure are not limited thereto. For example, when the definition of feature is extended, the value of sps_input_format_id may also be extended.

The type and property of an input source according to the range of sps_input_format_id value may vary depending on a change of a VCM input source. However, in order to effectively express different types of input source information in a single syntax, the basic structures of syntaxes according to Embodiment 1 of the present disclosure may still be used.

As described above, according to Embodiment 1 of the present disclosure, when the type and property of a VCM input source is defined in two stages or a single stage by using one higher level syntax, for example, a sequence parameter set, the information may be expressed more effectively.

Embodiment 2

According to Embodiment 2 of the present disclosure, supplementary information and meaning information for VCM encoding information may be provided. This is directed to rightly using the VCM encoding information for a task purpose. The supplementary information and the meaning information may vary depending on an input source type.

FIG. 14 and FIG. 15 are views showing syntax structures including supplementary information and meaning information according to an embodiment of the present disclosure. FIG. 14 assumes that the type and property of an input source are defined in two stages as described above with reference to FIG. 10. FIG. 15 assumes that the type and property of an input source are defined in a single stage as described above with reference to FIG. 13. Hereinafter, the description overlapping with FIG. 10 and FIG. 13 will be omitted or simplified.

Referring to FIG. 14 and FIG. 15, a sequence parameter set seq_parameter_set_rbsp may include a plurality of syntax elements related to the supplementary information and meaning information of VCM encoding information.

A syntax element supplementary_info_flag may indicate whether or not supplementary information is encoded. For example, supplementary_info_flag with a value of 0 may indicate that the supplementary information is not encoded. On the other hand, supplementary_info_flag with a value of 1 may indicate that the supplementary information is encoded.

Supplementary information may also be differently defined depending on a type of an input source. For example, if the input source is an image/video, supplementary information related to the image/video is encoded, and if the input source is a feature, supplementary information related to the feature is encoded. In the examples of FIG. 14 and FIG. 15, supplementary information related to an image/video and supplementary information related to a feature are defined as video_supplementary_info and feature_supplementary_info, respectively.

| As examples of supplementary information related to an image/video input video_supplementary_info, there may be importance information necessary to perform a machine task, a descriptor for an image/video (e.g., foreground and background information, bounding box information, feature information for search) and the like. As examples of supplementary information related to a feature feature_supplementary_info, there may be feature map configuration information (e.g., channel alignment information, importance information of each channel) and the like.

A syntax element feature_meaning_flag may indicate whether or not information on the meaning and use method of an encoded VCM bitstream is encoded. For example, feature_meaning_flag with a value of 0 may indicate that the information is not encoded. On the other hand, feature-_meaning_flag with a value of 1 may indicate that the information is encoded.

For feature information, an extraction method may vary depending on a machine task purpose. Accordingly, the meaning information of a feature may be needed to rightly use encoded feature information. Thus, in the examples of FIG. 14 and FIG. 15, the meaning information related to a feature is defined as a syntax element feature_info.

As examples of the meaning information related to a feature feature_info, there may be a feature extraction method (e.g., a type of a feature extraction network and an extraction location), a feature reconstruction method (e.g., supplementary information for dequantization), a method for using a shared backbone, and the like.

As described above, according to Embodiment 2 of the present disclosure, the supplementary information and meaning information of VCM encoding information may be encoded by different methods according to the type of an input source. Accordingly, information may be provided to enable the VCM encoding information to be rightly used for a task purpose, and task efficiency may be improved.

Embodiment 3

Embodiment 3 of the present disclosure provides a method for encoding supplementary information related to an image/video input video_supplementary_info.

FIG. 16 is a view showing examples of input images distinguished with foreground and background.

Referring to FIG. 16, an input image may be divided into a foreground (the box region of FIG. 16), which is a space region necessary for image analysis, and a background excluding the foreground. In VCM, any one of the foreground and background of an input image may be selectively compressed according to a task purpose. In this case, to rightly use a compressed bitstream for the task purpose, information indicating a type (e.g., foreground or background) of corresponding data is needed.

FIG. 17 is a view showing a syntax structure including supplementary information of an image/video input according to an embodiment of the present disclosure.

Referring to FIG. 17, a syntax supplementary_info may include a plurality of syntax elements as supplementary information of an input image.

A syntax element structured_coding_flag may indicate whether or not to divide an input image into a foreground and a background and then to code the input image in a structured bitstream. For example, structured_coding_flag of a value of 1 may indicate that the input image is spatially divided into the foreground and the background and then compression is performed. On the other hand, structured_coding_flag of a value of 0) may indicate that compression is performed without spatially dividing the input image.

Based on structured_coding_flag being 1, syntax elements background_coding_flag and number_of_foreground_regions may be encoded.

The syntax element background_coding_flag may indicate whether or not background information in an input image is encoded. For example, background_coding_flag with a value of 1 may indicate that the background information is encoded. On the other hand, background_coding_flag with a value of 0 may indicate that only foreground information excluding the background is encoded.

The syntax element number_of_foreground_regions may indicate the number of regions that are defined as foreground in the input image. number_of_foreground_regions may also be defined in a picture unit in a picture parameter set or a picture header and may have a value equal to or greater than 1.

| Syntax elements foregroud_x_pos, foreground_y_pos, foreground_width and foreground_height are information on the position of a foreground and may be encoded repeatedly as many times as the number of foregrounds defined as number_of_foreground_regions. There is no particular restriction on the shape of a foreground region, but in FIG. 17, the foreground region is assumed to have a rectangular shape, and the x and y coordinates of an upper left apex and the width and height are encoded for the foreground region. Specifically, foreground_x_pos may indicate the x coordinate of the upper left apex of the foreground region, and foreground_y_pos may indicate the y coordinate of the upper left apex of the foreground region. In addition, foreground_width may indicate the width of the foreground region, and foreground_height may indicate the height of the foreground region.

Embodiment 4

In VCM, the requirement as shown in Table 6 is defined in relation to privacy.

TABLE 6

| |
|---|
| VCM shall support privacy and security (Mandated by ISO) "to protect privacy, sufficient for intelligence tasks but insufficient to reconstruct video without the additional video bitstream." |

According to Table 6, VCM should support privacy and security, and VCM information should be sufficient to perform a machine task but be insufficient to construct a video. To this end, in order for an agent managing information to image and use collected information, the agent should be able to know whether or not the collected information includes personal information and a personal information protection level such as whether or not the personal information is anonymized, and the like. To this end, relevant information should be explicitly specified in a VCM bitstream.

According to Embodiment 2 of the present disclosure, information on a personal information property may be used to use and manage a VCM bitstream. The information on the personal information property may be encoded in any one unit of sequence, picture, and feature channel. FIG. 18A shows an example of information on a personal information property encoded in a picture unit, and FIG. 18B shows an example of information on a personal information property encoded in a sequence unit. In addition, information on a personal information property may be encoded as a part of supplementary information that is described above with reference to FIG. 14 and FIG. 15.

Referring to FIG. 18A and FIG. 18B, a syntax element data_property_id may be defined as information on a personal information property in each syntax. The meaning of data_property_id is as shown in Table 7.

TABLE 7

| data_property_id | property | description |
|---|---|---|
| 0 | Pseudonymized data | indicates that VCM bitstream consists of pseudonymized information |
| 1 | Anonymized data | indicates that VCM bitstream consists of de-identified information |
| 2 | Identified data | indicates that VCM bitstream has personal identification information |

Referring to Table 7, according to a personal information property included in a VCM bitstream, a method for use and management may be different. For example, since personal identification is impossible, "Anonymized data" may be used without particular regulation. On the other hand, since a specific person may be identified through connection of pseudonymized data, "Pseudonymized data" may not be completely free from regulations.

Hereinafter, a feature encoding/decoding method according to an embodiment of the present disclosure will be described with reference to FIG. 19 and FIG. 20.

FIG. 19 is a flowchart showing a feature encoding method according to an embodiment of the present disclosure. The feature encoding method of FIG. 19 may be performed by a feature encoding apparatus.

Referring to FIG. 19, the feature encoding apparatus may generate first information indicating whether or not an input source is feature data (S1910). Herein, the first information may be included in a sequence parameter as input format identification information.

Based on the input source being the feature data, the feature encoding apparatus may generate second information indicating a feature map type of the feature data (S1920). In addition, the feature encoding apparatus may generate encoding information of the feature data (S1930).

In addition, the feature encoding apparatus may encode the first information, the second information and the encoding information in a bitstream (S1940).

In an embodiment, the second information may be included in the sequence parameter set as feature format identification information.

Alternatively, in another embodiment, the second information may also be included in the input format identification information together with the first information. In this case, based on the input source being image data, the input format identification information may have a value of a first range (e.g., 0 to 3). On the other hand, based on the input source being feature data, the input format identification information may have a value of a second range (e.g., 4 or 5).

In an embodiment, the encoding information may include supplementary information related to a method for constructing a feature map of the feature data and meaning information related to a method for extracting and reconstructing the feature data.

FIG. 20 is a flowchart showing a feature decoding method according to an embodiment of the present disclosure. The feature decoding method of FIG. 20 may be performed by a feature decoding apparatus.

Referring to FIG. 20, the feature decoding apparatus may determine whether or not an input source is feature data (S2010). Herein, whether or not the input source is the feature data may be determined based on input format identification information that is obtained from a sequence parameter set.

Based on the input source being the feature data, the feature decoding apparatus may determine a feature map type of the feature data (S2020). In addition, the feature decoding apparatus may obtain encoding information of the feature data from a bitstream (S2030).

In addition, the feature decoding apparatus may decode the feature data based on the feature map type and the encoding information (S2040).

In an embodiment, the feature map type may be determined based on feature format identification information that is obtained from the sequence parameter set.

Alternatively, in another embodiment, the feature map type may be determined based on a value of the input format identification information. In this case, based on the input format identification information having a value of a first range (e.g., 0 to 3), it may be determined that the input source is image data. On the other hand, based on the input format identification information having a value of a second range (e.g., 4 or 5), it may be determined that the input source is the feature data.

In an embodiment, the encoding information may include supplementary information related to a method for constructing a feature map of the feature data and meaning information related to a method for extracting and reconstructing the feature data.

In an embodiment, the encoding information may include data property information indicating a privacy protection level.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example, Blu-ray Disc (BD), Universal Serial Bus (USB), ROM. PROM, EPROM. EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

FIG. 21 is a view illustrating an example of a content streaming system to which embodiments of the present disclosure are applicable.

Referring to FIG. 21, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

FIG. 22 is a diagram illustrating another example of a content streaming system to which embodiments of the present disclosure are applicable.

Referring to FIG. 22, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system.

INDUSTRIAL APPLICABILITY

The embodiments of the present disclosure may be used to encode or decode a feature/feature map.

The invention claimed is:

1. A feature decoding method performed by a feature decoding apparatus, the feature decoding method comprising:

determining, based on input format identification information signaled from a bitstream, at least one of whether or not an input source is feature data or a feature map type of the feature data, wherein the input format identification information equal to a first value indicates that the input source is image data, the input format identification information equal to a second value indicates that the input source is the feature data and the feature map type of the feature data is a first feature map type, and the input format identification information equal to a third value indicates that the input source is the feature data and the feature map type of the feature data is a second feature map type;

obtaining encoding information of the feature data from the bitstream based on the input source being the feature data; and decoding the feature data based on the feature map type and the encoding information.

2. The feature decoding method of claim 1, wherein the encoding information includes supplementary information related to a method for constructing a feature map of the feature data and meaning information related to a method for extracting and reconstructing the feature data.

3. The feature decoding method of claim 1, wherein the encoding information includes data property information indicating a privacy protection level.

4. A feature encoding method performed by a feature encoding apparatus, the feature encoding method comprising:

generating input format identification information indicating at least one of whether or not an input source is feature data;

or a feature map type of the feature data, wherein the input format identification information equal to a first value indicates that the input source is image data, the input format identification information equal to a second value indicates that the input source is the feature data and the feature map type of the feature data is a first feature map type, and the input format identification information equal to a third value indicates that the input source is the feature data and the feature map type of the feature data is a second feature map type;

generating encoding information of the feature data based on the input source being the feature data; and encoding the input format identification information and the encoding information into a bitstream.

5. The feature encoding method of claim 4, wherein the encoding information includes supplementary information related to a method for constructing a feature map of the feature data and meaning information related to a method for extracting and reconstructing the feature data.

6. A computer-readable recording medium storing a bitstream generated by the feature encoding method of claim 4.

7. A method for transmitting a bitstream, comprising:

generating input format identification information indicating at least one of whether or not an input source is feature data;

or a feature map type of the feature data, wherein the input format identification information equal to a first value indicates that the input source is image data, the input format identification information equal to a second value indicates that the input source is the feature data and the feature map type of the feature data is a first feature map type, and the input format identification information equal to a third value indicates that the input source is the feature data and the feature map type of the feature data is a second feature map type;

generating encoding information of the feature data based on the input source being the feature data; and encoding the input format identification information and the encoding information into the bitstream.

* * * * *